(12) United States Patent
Suzuki et al.

(10) Patent No.: US 6,563,245 B1
(45) Date of Patent: May 13, 2003

(54) DC BRUSH MOTOR

(75) Inventors: Masao Suzuki, Owariasahi (JP); Hiroyuki Takagi, Gifu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/664,048

(22) Filed: Sep. 18, 2000

(30) Foreign Application Priority Data

Sep. 16, 1999 (JP) .......................................... 11-262603

(51) Int. Cl.⁷ ................................................ H02K 5/00
(52) U.S. Cl. .......................... 310/91; 310/89; 310/233; 310/239
(58) Field of Search .............................. 310/91, 90, 89, 310/229, 230, 233, 239, 242, 251

(56) References Cited

U.S. PATENT DOCUMENTS

| | | | | |
|---|---|---|---|---|
| 3,870,914 A | * | 3/1975 | Walker | 310/219 |
| 5,250,862 A | * | 10/1993 | Uzawa | 310/40 MM |
| 5,434,463 A | * | 7/1995 | Horski | 310/248 |
| 5,528,096 A | * | 6/1996 | Orii et al. | 310/237 |
| 5,614,775 A | * | 3/1997 | Horski et al. | 310/68 R |
| 5,821,662 A | * | 10/1998 | Kajino et al. | 310/239 |
| 5,866,961 A | * | 2/1999 | Suzuki et al. | 310/67 R |
| 5,949,174 A | * | 9/1999 | Moss et al. | 310/233 |

FOREIGN PATENT DOCUMENTS

| | | | | |
|---|---|---|---|---|
| GB | 2062973 | * | 5/1981 | ........... H01R/39/38 |
| JP | 10-174360 | | 6/1998 | |
| JP | 10-248225 | | 9/1998 | |
| JP | 11-4560 | | 1/1999 | |

* cited by examiner

Primary Examiner—Thanh Lam
(74) Attorney, Agent, or Firm—Burns, Doane, Swecker & Mathis, LLP

(57) ABSTRACT

A DC brush motor includes an armature fixed to a shaft for unitary rotation with the shaft. The shaft is rotatably supported with respect to a case by way of a pair of bearings. The armature is made up of a core, a coil winding, and a resin-made supporting member for supporting the core with the core 9 rotating together with the shaft. The supporting member has a concave or recessed portion for receiving a boss of the case. Several commutator segments forming a commutator are arranged along the inner periphery of the recessed portion. A brush is held in a brush holder and is biased outwardly by the biasing force of a coil spring to contact a brush contact portion of the brush.

20 Claims, 10 Drawing Sheets

DC BRUSH MOTOR

This application is based on and claims priority under 35 U.S.C. §119 with respect to Japanese Patent Application No. 11(1999)-262603 filed on Sep. 16, 1999, the entire content of which is incorporated herein by reference.

FIELD OF THE INVENTION

The present invention generally relates to a motor. More particularly, the present invention pertains to a DC brush motor used as a driving source in applications such as a vehicular window regulator, power operated seat, and ABS (anti-skid brake system).

BACKGROUND OF THE INVENTION

The axial dimension of a DC brush motor depends on the length of the armature made up of a coil winding and a core, the length of the brush or commutator, the length of the bearing, and the gaps that are required between adjacent members forming the motor. FIG. 11 illustrates an arrangement which makes it possible to shorten the axial length of a DC brush motor. In this motor construction, the out put side of a shaft 61 is supported in a rotatable fashion with respect to a casing 62 and a cover 73 by way of respective bearings 63a, 63b. The bearing 63b and a commutator 65 are positioned at opposite sides of an armature 64. To shorten the axial length of the DC brush motor, the bearing 63b and a portion of the commutator 65 are placed inside a coil winding 66 of the armature 64. A brush 67 and a brush supporting member 68 are disposed between one end of the armature 64 and the output side cover 73.

FIG. 12 illustrates a motor similar to that disclosed in Japanese Patent Laid-Open Publication No. Hei. 10 (1998)-248225. In this motor, a commutator 65 is disposed inside an armature 64 and a brush 67 is disposed inside the armature 64 so as to be movable in parallel with a shaft 61. The brush 67 is accommodated within a plurality of brush holders 68b which project in the axial direction of the armature 64 toward a disc-shaped main body 68a. The brush 67 is urged by a spring 69 to be in contact with a contact portion 65a of the commutator 65a.

FIG. 13 illustrates another motor similar to that disclosed in Japanese Patent Laid-Open Publication No. Hei. 10 (1998)-174360. This electric motor is used as a driving source for an automotive ABS system. The motor includes a shaft 61 having opposite ends rotatably supported by respective bearings 63a, 63b.

An output transmitting member 70 is positioned at a side of the bearing 63a, and a bearing 72 is provided on the output transmitting member 70 for converting rotational movement of the shaft 61 into reciprocating movement of a plunger 71.

With the motor construction shown in FIG. 11, the motor still possesses an axial length necessary for accommodating the brush 67 and the brush supporting member 68, thus making it difficult to make the motor smaller or thinner.

With the motor construction shown in FIG. 12, although the commutator 65 and the brush 67 can be inside the range defined or limited by the axial length of the armature 64, the bearing 63a cannot be placed inside the armature 64 due to the existence of the disc-shaped main body 68a between the bearing 63a and the brush 67. As a result, limitations are placed on the ability to make the motor smaller. In addition, with this structure, the contact portion or segment 65a is sector-shaped and is placed at just the outer side of the shaft 61 which is a narrow portion, thus making it quite difficult if not impossible to establish a sufficient area of the segment 65a, resulting in higher brush current density and thereby raising a problem which increases the brush friction.

With the structure shown in FIG. 13, the bearing 72 is placed next to the inside of the bearing 63a so that the flexing of the shaft 61 is lessened when compared to placing the bearing 72 next to the outside of the bearing 63a. However, in this construction, the bearing 72 has to be isolated from the bearing 63b in such a manner that the difference between the two bearings is greater than the sum of the axial lengths of the armature 64 and the commutator. As a result, the span between the bearings 63b, 72 is relatively larger, and so a problem arises in that the vibration reduction effect associated with the reduced flexing of the shaft 61 becomes insufficient.

SUMMARY OF THE INVENTION

The present invention provides a DC brush motor that includes an armature having a recessed or concave portion, a pair of bearings rotatably supporting the armature, a brush and a commutator. The brush, the commutator, and one of the bearings located nearer to the brush is accommodated in the recessed portion of the armature so as to be axially positioned within the axial length range of the armature. The axial length of the motor is thus shorter than that of a motor constructed so that the bearings, the brush, and the commutator are positioned outside the armature.

According to another aspect of the invention, a DC brush motor includes an armature, a commutator rotatable together with the armature, and having a brush contact portion oriented in the radially inward direction, and a brush extending in the radially outward direction to contact the brush contact portion of the commutator. With this construction, the accommodating portion in which the brush is accommodated is shorter in the axial extent as compared to a construction in which the brush is positioned to be movable in the axial direction of the armature.

According to a further aspect of the invention, A DC brush motor includes an armature having a cup-shaped or concave portion, a pair of bearings rotatably supporting the armature, and a commutator rotatable together with the armature. The commutator has a brush contact portion oriented radially inwardly, and a brush extends radially outwardly to contact the brush contact portion of the commutator. The brush, the commutator, and one of the bearings located nearer to the brush are accommodated in the cup-shaped or concave portion of the armature so as to be axially positioned within the axial length range of the armature.

The bearings located farther from the brush is at least partly accommodated in the armature so that the bearing located farther from the brush is axially located at least partly in the axial length range of the armature. The core of the armature can be in the form of a molding made of soft magnetic powder material. This increases the flexibility in design of the core shape as compared to an armature made of stacked iron plates (steel plates). In addition, the core possesses improved specific resistance compared to the stacked core, thus lowering the eddy current loss considerably and improving the motor efficiency.

The armature includes a shaft supported by the bearings, wherein the shaft has an eccentric portion formed on an output shaft portion. The eccentric portion is provided with a transmission bearing to transmit rotational movement of the output shaft portion to a driving portion which reciprocates. When the output shaft portion rotates, the resulting rotation is transmitted by way of the transmission bearing mounted on the eccentric portion of the output shaft portion to the driving portion to causes reciprocating movement of the driving portion. Due to the relatively short span between the pair of bearings supporting the shaft of the armature, the flexing of the shaft is relatively small when a radial force is applied to the shaft by way of the transmission bearing. In addition, the transmission bearing is placed inside the bearing which supports the armature. This reduces the flexing of the shaft when a radial force is applied to the shaft by way of the transmission bearing.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

Figure 1:
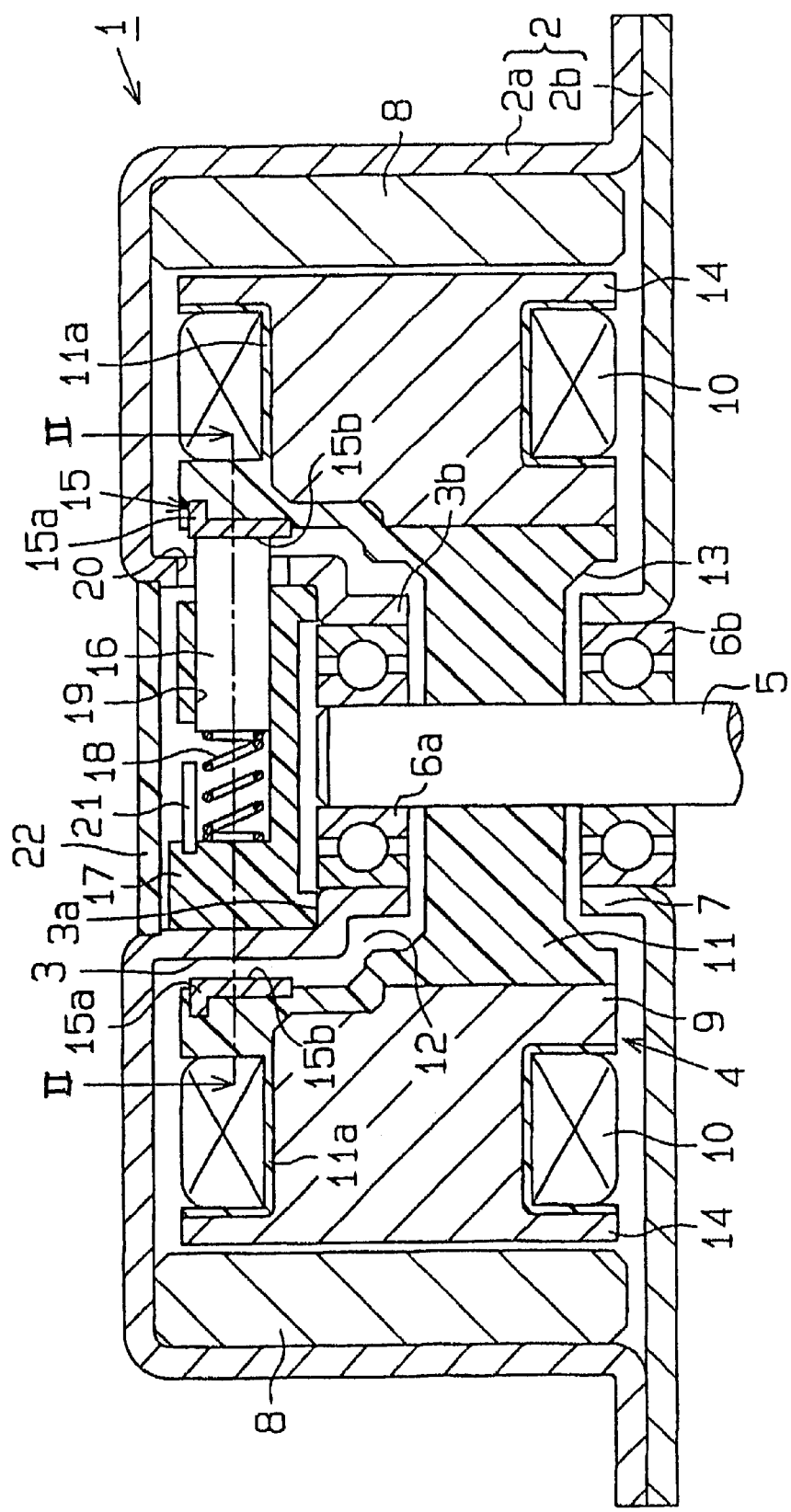
FIG. 1 is a cross-sectional view of a DC motor in accordance with a first embodiment of the present invention.
Figure 2:
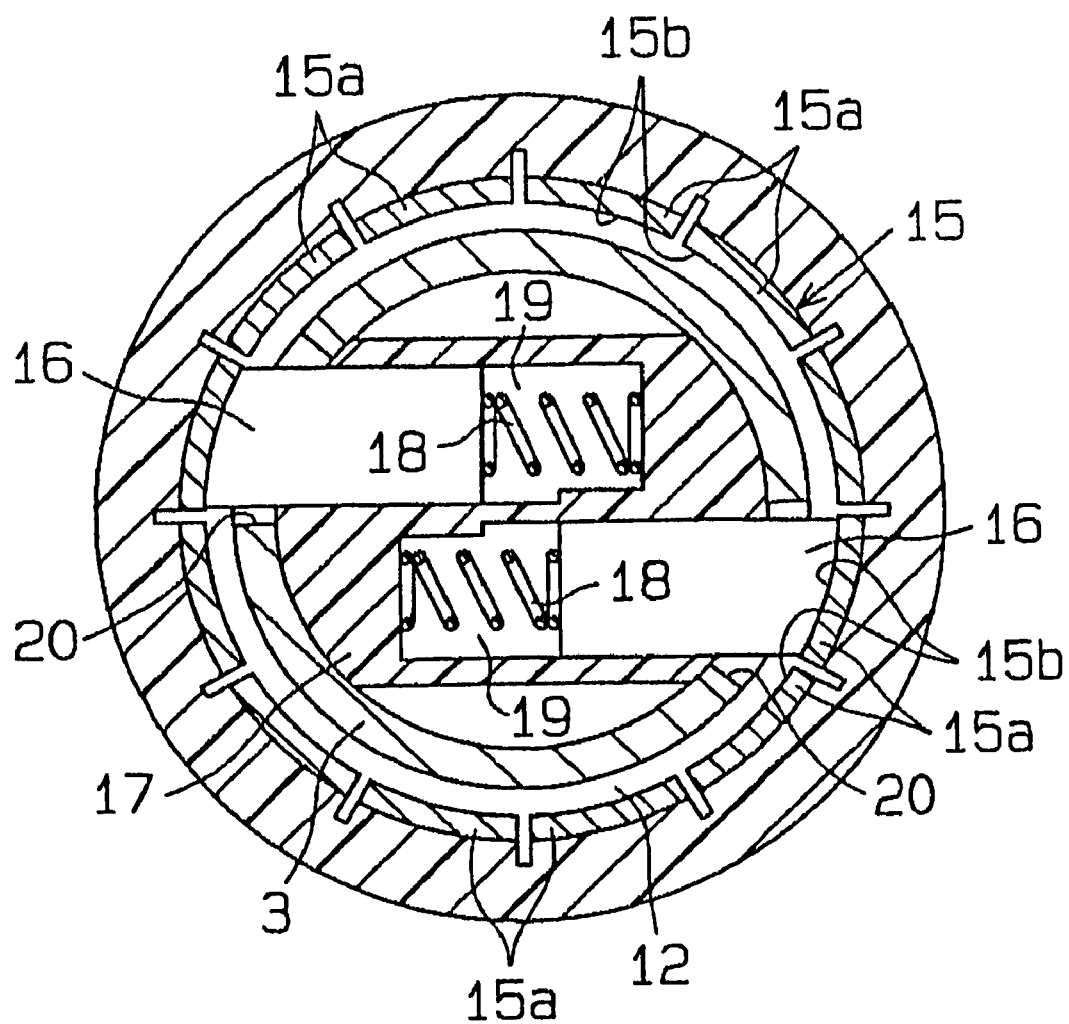
FIG. 2 is a cross-sectional view of the DC motor shown in FIG. 1 taken along line the section line II—II.
Figure 4A:
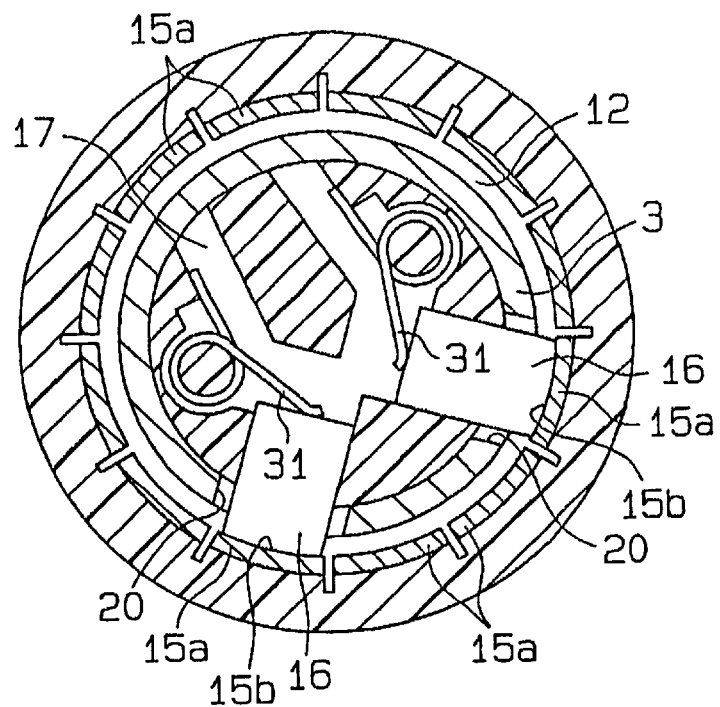
Figure 4B:
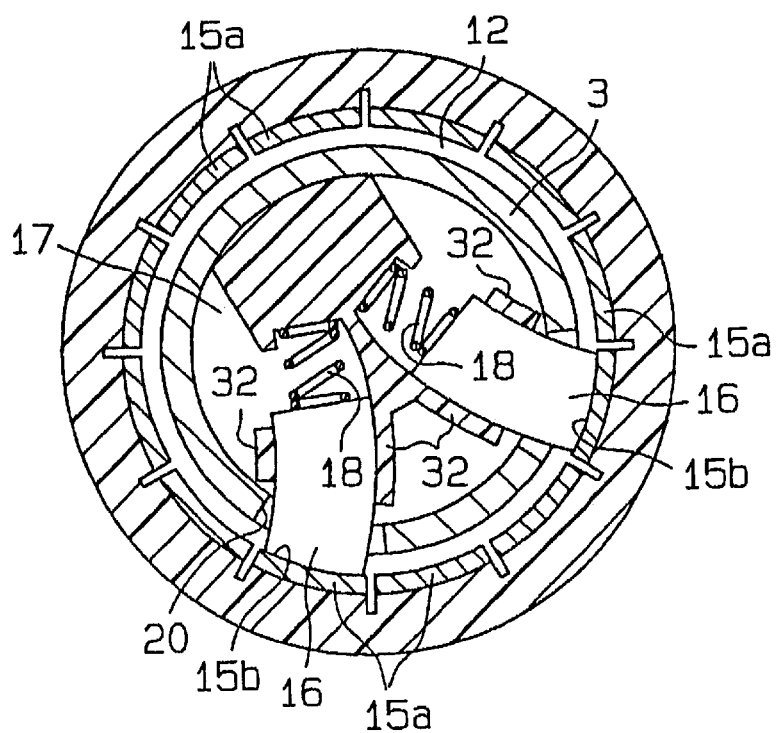
Figure 5:
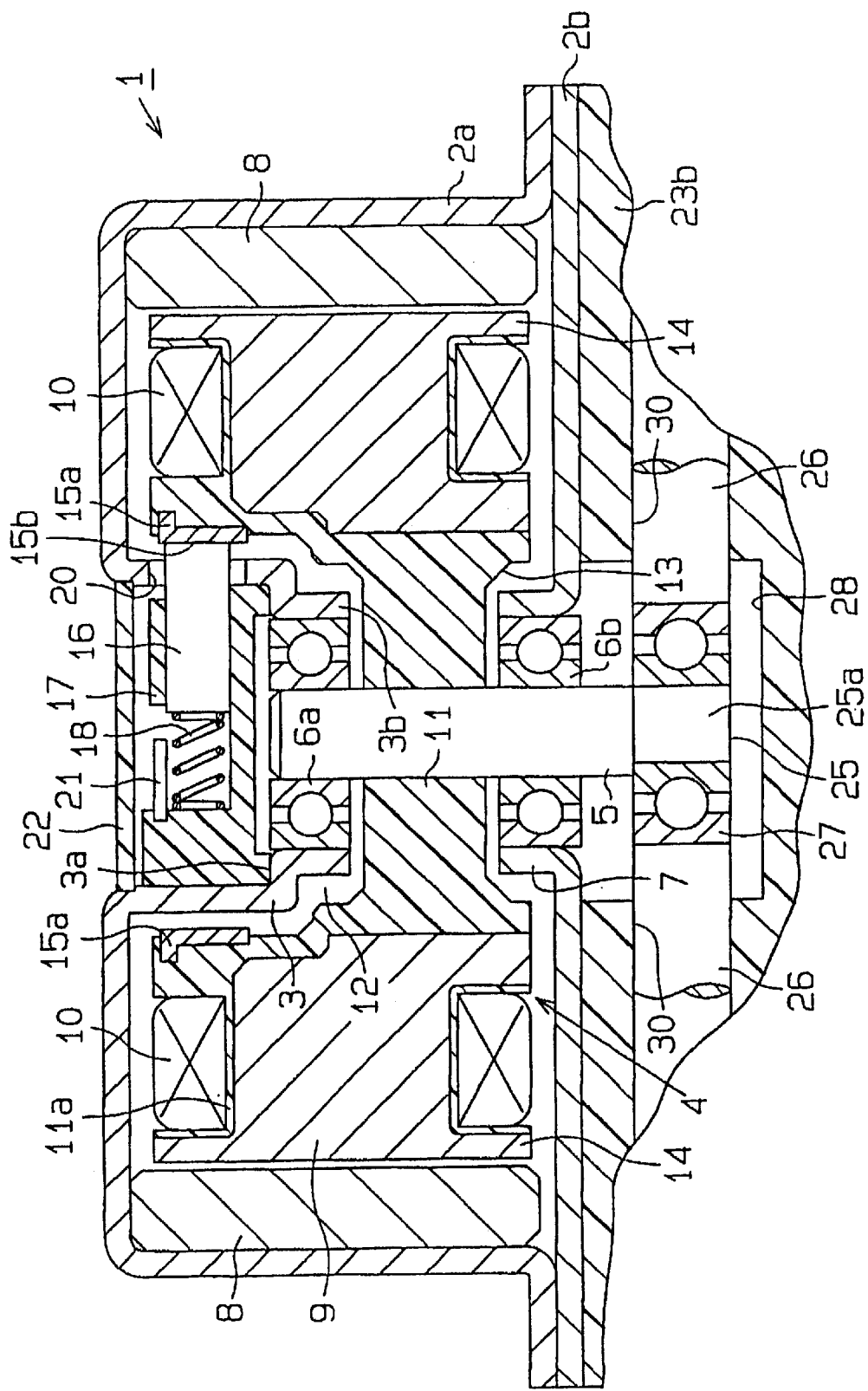
Figure 6:
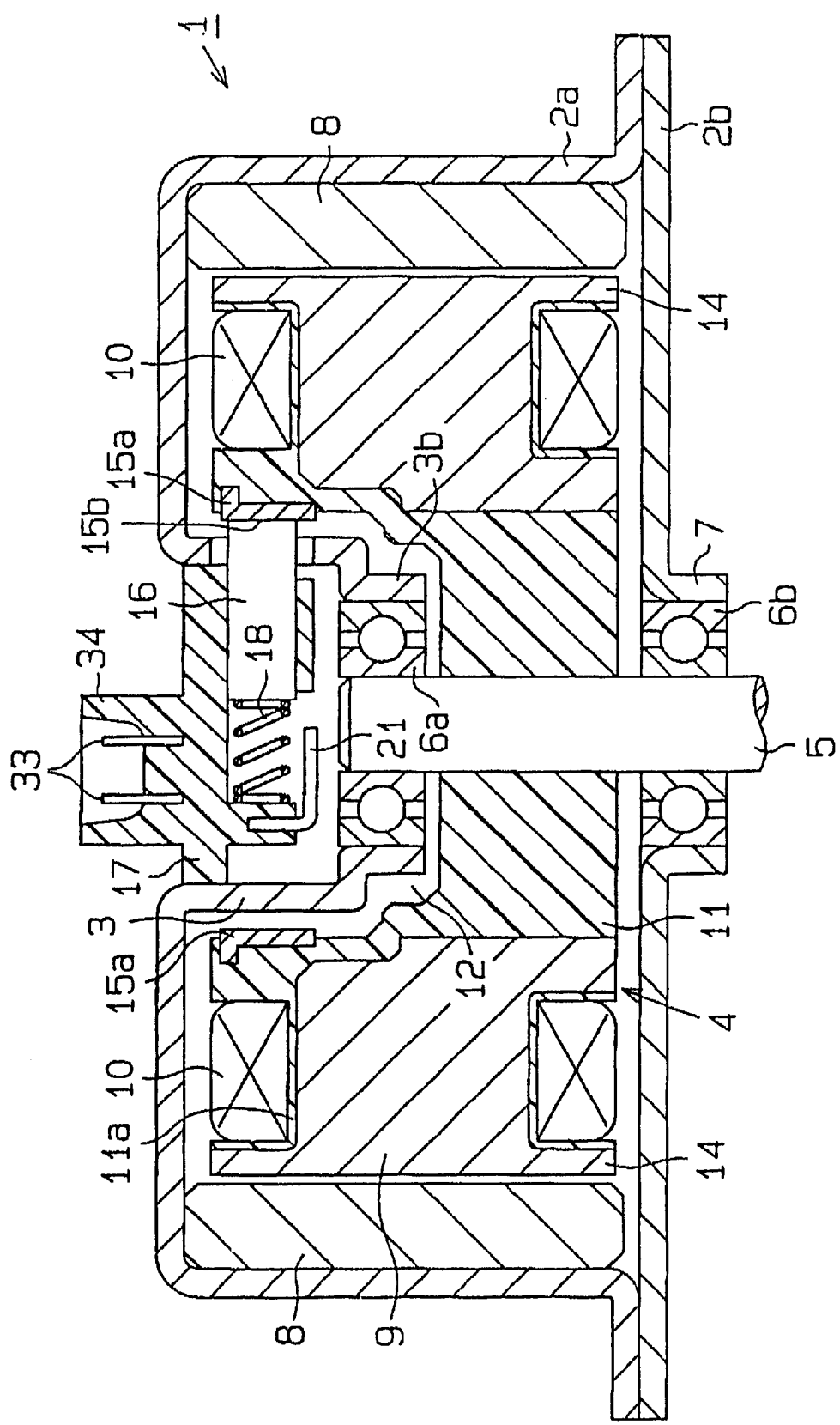
Figure 7:
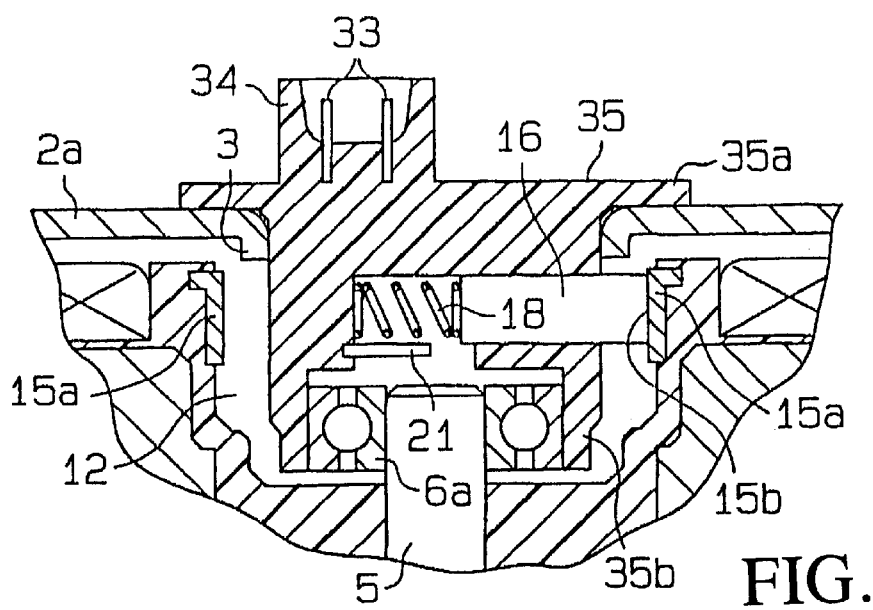
Figure 8:
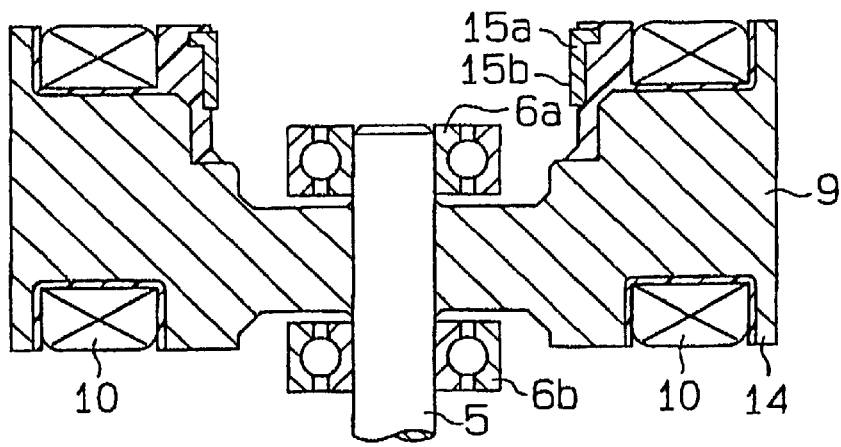
Figure 9:
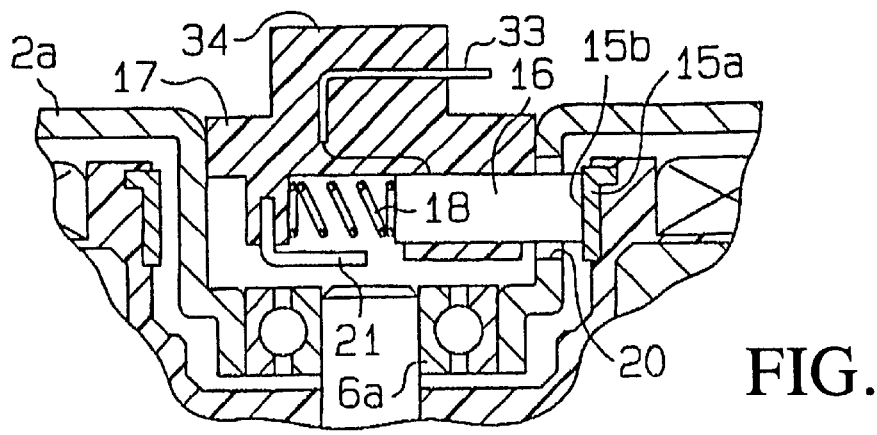
Figure 10:
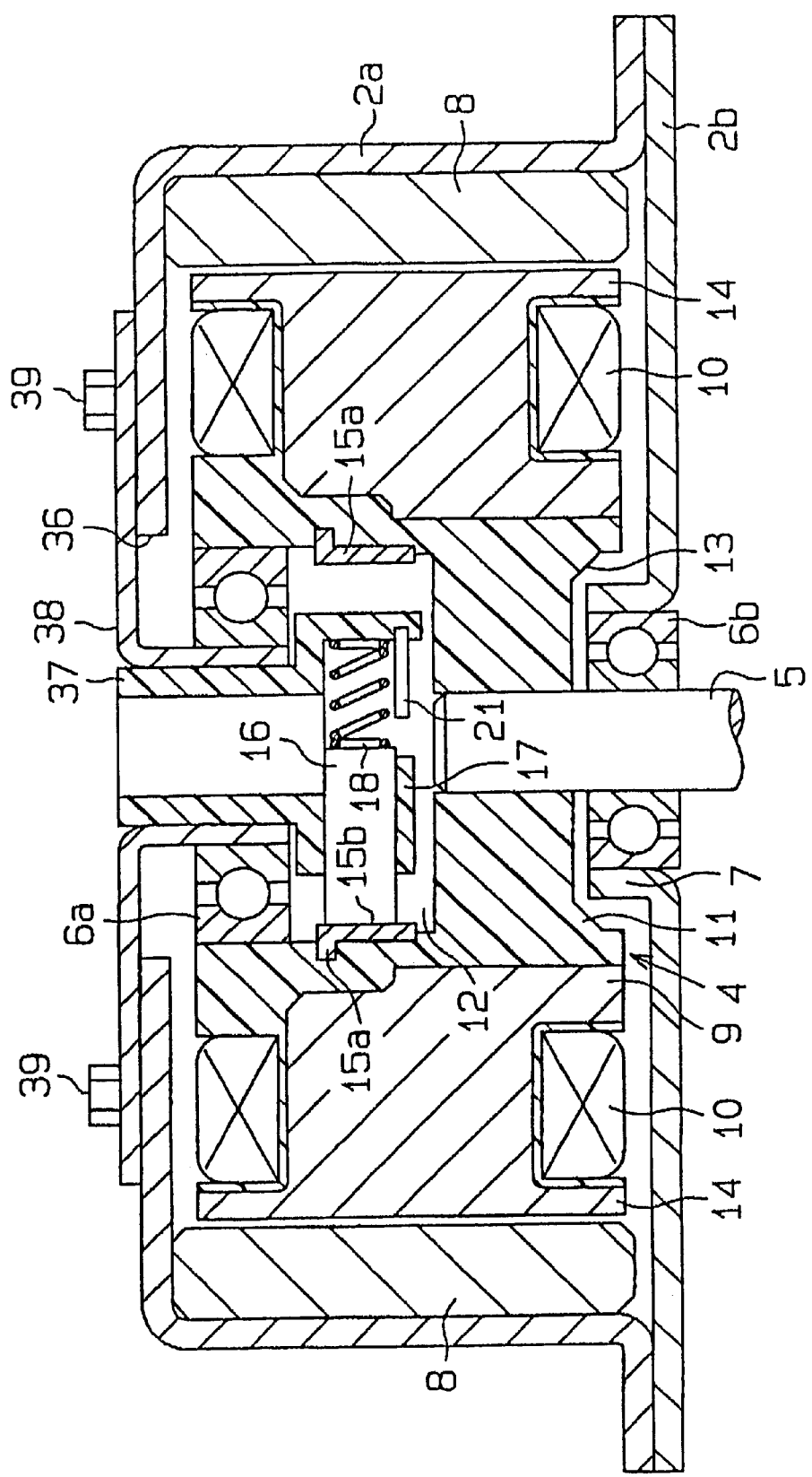
Figure 11:
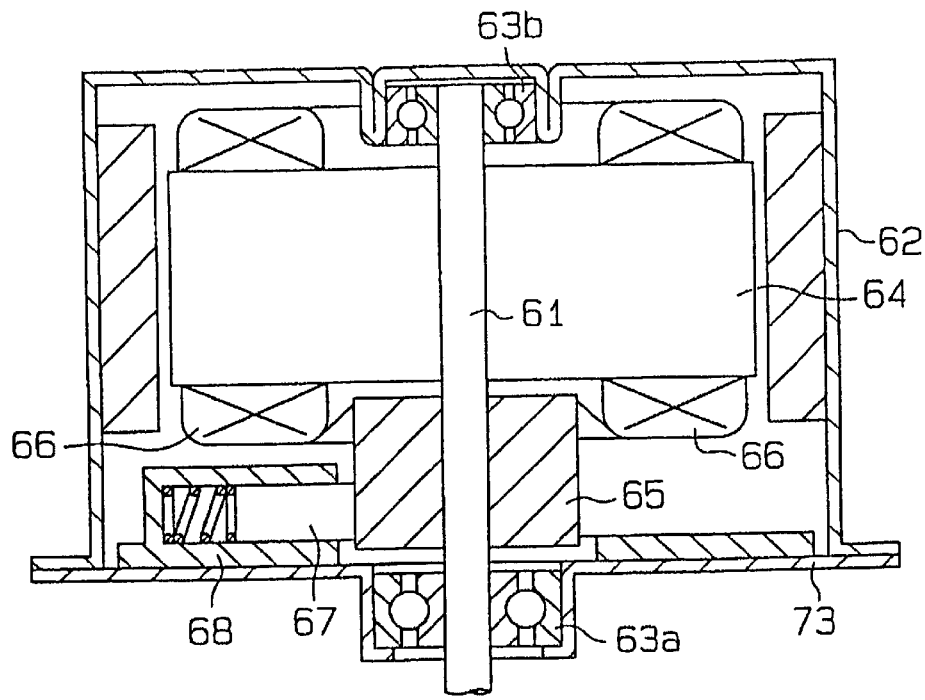
Figure 12:
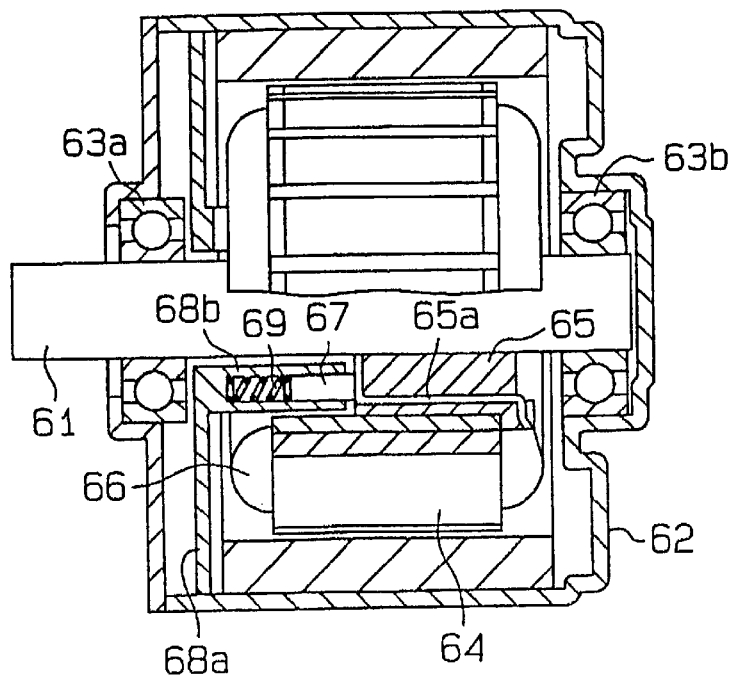
Figure 13:
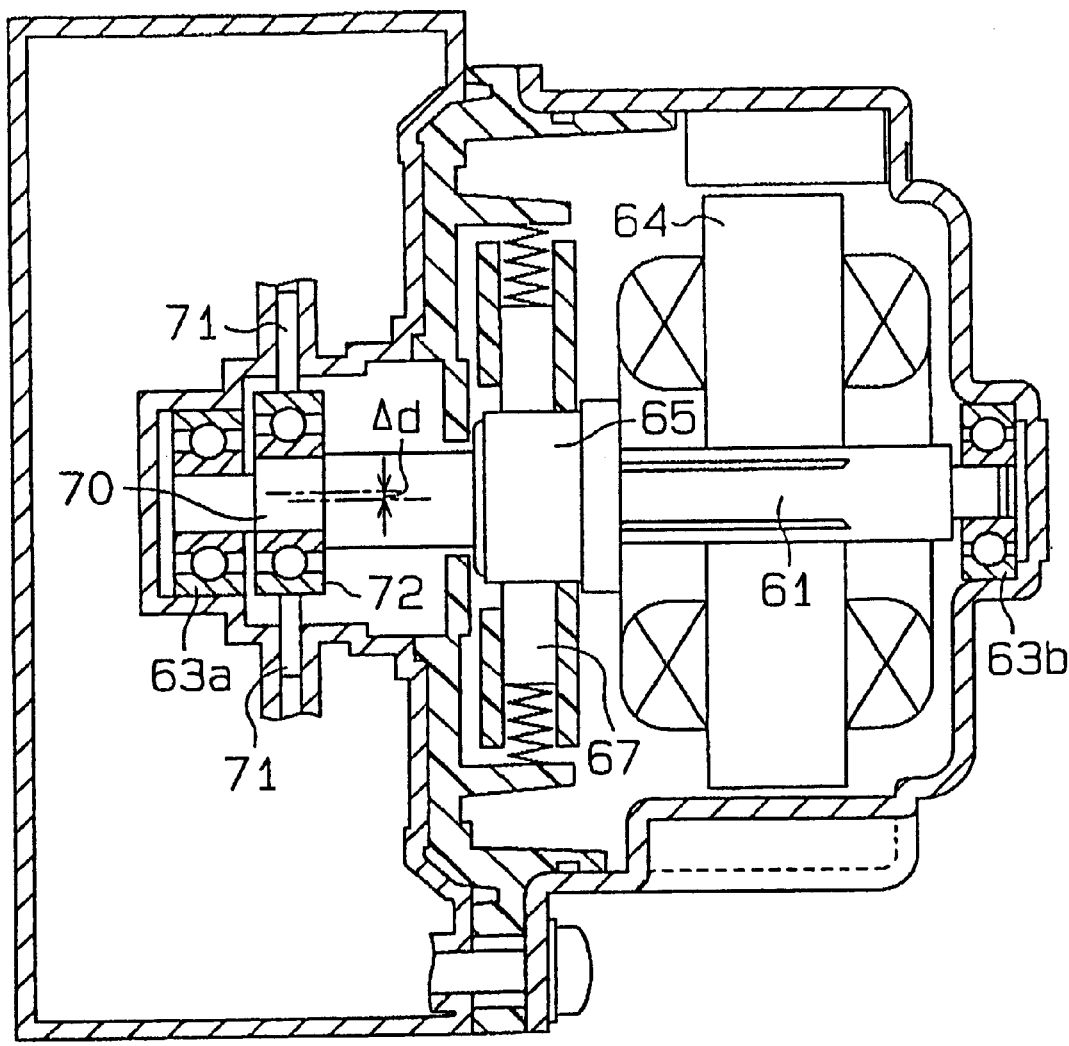

FIG. 4(a) and FIG. 4(b) are cross-sectional views of the DC motor illustrating alternative brush positioning conditions corresponding to the motor structure shown in FIG. 2;

FIG. 5 and FIG. 6 are cross-sectional views of different operation modes of the device shown in FIG. 1;

FIG. 7 is a cross-sectional view of the DC motor illustrating another mode of how bearing is supported;

FIG. 8 is a cross-sectional view of the DC motor illustrating another mode of how the core is supported;

FIG. 9 is a cross-sectional view of the DC motor illustrating another mode of the brush holder;

FIG. 10 is a cross-sectional view of the DC motor illustrating a different mode of the brush and bearing arrangement; and FIG. 11 is a cross-sectional view of a DC motor of known construction;

FIG. 12 is a cross-sectional view of a DC motor of another known construction; and FIG. 13 is a cross-sectional view of a DC motor of a further known construction.

DETAILED DESCRIPTION OF THE INVENTION

Referring to FIG. 1, a first embodiment of a DC brush motor 1 includes a case 2 that is made up of a main body 2a serving as a yoke and an end plate or lid 2b. The main body 2a has an open side covered by the end plate 2b. The main body 2a is in the form of a bottom walled cylinder with a boss portion 3 being provided at the central portion of the bottom wall. The boss portion 3 includes a stepped portion 3a thus defining a small diameter portion 3b of the boss portion 3. The small diameter portion 3b is snugly fitted within a first bearing 6a. A shaft 5 of an armature 4 is supported by the first bearing 6a and a second bearing 6b. As described in more detail below, the bearing 61 is located nearer to a brush 16. The end plate 2b is formed at its central portion with a cylindrical boss portion 7 into which the bearing 6b is snugly fitted.

A magnet 8 is secured inside the main body 2a of the case 2. The magnet 8 possesses an axial length that substantially coincides with an inner axial length of the main body 2a of the case 2. The armature 4 is fixedly mounted on the shaft 5 which is rotatably connected to the case 2 via the pair of bearings 6a, 6b so that the armature 4 and the shaft 5 rotate concurrently. The armature 4 is made up of a core 9, a coil winding 10, and a resin-made supporting member 11 which causes the core 9 to rotate together with the shaft 5. The supporting member 11 is formed integrally with the shaft 5 and has an axial length which is slightly shorter than that of the magnet 8.

The supporting member 11 is provided with a first concave or recessed portion 12 at the side facing the bottom wall of the main body 2a of the case 2. The first recessed portion 12 is adapted to receive the boss portion 3 of the main body 2a. The supporting member 11 is also provided with a second concave or recessed portion 13 at the side facing the end plate 2b. The second recessed portion 13 is adapted to partly receive the boss portion 7 of the end plate 2b. Thus, the bearing 6a is placed within an axial length range of each of the magnet 8 and the armature 4. That is, the axial positioning of the bearing 6a overlaps with the axial positioning of the magnet 8 and the armature 4. In addition, the bearing 6b is located relative to the armature 4 so that the two partially overlap in the axial extent. The depth or axial extent of the recessed portion 12 of the supporting member 11 substantially reaches the center of the thickness or the center of the axial extent of the core 9. The supporting member 11 possesses an integral positioning portion 11a in a region that overlaps with the core 9. This positioning portion 11a is used for winding the coil winding 10 when the supporting member is insulated from the core 9.

Instead of plural stacked iron plates, the core 9 is formed of a soft magnetic powder molding. For example, to form such a molding, insulating treated bonding pure iron powder is bonded with a resin binder and the resulting mixture is formed into a ring-shaped molding by press formation. So long as the minimum magnetic flux area is ensured, if the core 9 is formed with a hollow portion (not shown), the weight and the inertial force of the core 9 can be reduced. This makes it possible to provide a core 9 having a desired relatively small weight and a quick response ability.

The core 9 is fixed to the shaft 5 via the supporting member 11. The core 9 has an integral radially outwardly located outer wall 14 which is made of soft magnetic powder and which is positioned in opposition to the magnet 8. A concave or recessed portion in which is positioned the winding 10 is defined by the outer wall 14 on one side and an in-core magnetic flux path stepped portion of the core 9 and the portion of the supporting member bounding the recessed portion 13 on the other side.

A commutator 15 and the brush 16 are accommodated in the recessed portion 12 of the supporting member 11. Thus, the commutator 15 and the brush 16 are placed within an axial length range of each of the magnet 8 and the armature 4. That is, the axial positioning of the commutator 15 and the brush 16 overlaps the axial positioning of the magnet 8 and the armature 4. The commutator 15 is positioned at the opening side of the recessed portion 12. The commutator 15 includes a plurality of commutator members 15a formed integrally with the supporting member 11 upon formation thereof in such a manner that each of the commutator members 1a is exposed along the inner periphery of the recessed portion 12. That is, each of the commutator members 15a possesses a brush contact portion 15b at the side facing inwardly towards the central axis.

As shown in FIG. 2, there are twelve commutator members 15a in the illustrated embodiment. The commutator 15 is electrically connected to the coil winding 10. A plurality of brushes 16 are disposed in the boss portion 3 of the main body 2a of the case 2. The brushes 16 are positioned in a resin-made brush holder 17 located at a position for ensuring that the brushes 16 are capable of contacting the brush contact portion 15b.

As shown in FIG. 2, the brush holder 17 includes several accommodating portions 19, 19 in each of which is slidably fitted a brush 16 and a coil spring 18 which functions as a biasing mechanism. The accommodating portions 19 of the brush holder 17 are positioned in side-by-side relation to one another and are located in a plane extending perpendicular to the axis of the shaft 5. The accommodating portions 19 are adapted to be positioned in opposition to one of the brush contact portion 15b when the brush holder 17 is snugly fitted in the boss portion 3 such that the brush holder 17 rests on the stepped portion 3a of the boss portion 3. A pair of radially extending holes 20 is formed in the boss portion 3 through which the brushes 16 can pass and which are in opposition to one of the brush contact portions 15b. The holes 20 are oriented at a 180 degree phase difference with respect to one another relative to the brush contact portions 15b. Thus, the axes of movement of the two brushes 16 are spaced apart from one another as shown in FIG. 2.

The brush holder 17 is fixed at such position such that the brushes 16 are brought into contact with the brush contact portions 15b. The coil springs 18 are adapted to bias the respective brushes 16 outwardly and establish contact of the brushes 16 on the brush contact portions 15b. It is to be noted that a pin 21 is provided on the brush holder 17 to prevent removal of the coil spring 18 from the brush holder 17.

A cover member 22 is fitted at the open end of the boss portion 3 to close the open end. Lead wires connected to each of the brushes 16 extend outside the motor 1 by way of a notch (not shown) formed in the cover member 22.

The operation of the DC brush motor having the above-described features and characteristics is as follows. Examples of the context in which the motor can be used include as a driving source of a vehicular window regulator or a vehicular electrically operated seat.

When electric current is applied to the brush 16 from an external control circuit, the resulting current is fed to the coil winding 10 by way of the brush contact portion 15b and the commutator member 15a. Then, the magnetic force generated at the coil winding 10 and the magnetic force of the magnet 8 causes the armature 4 to rotate, thus causing rotation of the shaft 5 which rotates together with the armature 4. The resulting rotational force of the shaft 5 is used as the driving power.

In this version of the DC brush motor, a variety of advantages are realized. For example, several of the elements forming the motor are positioned in a manner permitting a smaller construction of the motor. For example, the brush 16, the commutator 15 and one of the bearings 6a, 6b rotatably supporting the shaft 5 and located nearer to the brush 16 are accommodated in the concave portion 12 of the supporting member 11 so that the bearing 6a, the brush 16 and the commutator 15 are within the axial length region of the armature 4. That is, the axial position of the bearing 6a, the brush 16 and the commutator 15 overlaps the axial position of the armature 4. The motor 1 is thus considerably shorter compared to other known DC brush motors. Also, because the motor can be made much smaller, it is possible to relatively easily position the motor almost anywhere.

The commutator 15 which rotates together with the armature 4 is configured so that the brush contact portion 15b is at a side of the axis and the brush 16 is designed to contact the brush contact portion 15b in the outward direction. Thus, providing the commutator members 15a along the inner periphery of the concave portion 12 of the armature 4 makes it possible to place the bearing 6a, the brush 16, and the commutator 15 within axial length region of the armature 4 in a relatively easy manner. In addition, compared to a commutator having an outward oriented brush contact portion, the contacting area of the brush contact portion 15b can become larger more easily if the position of the commutator remains unchanged.

Additionally, the bearing 6b which is remote from the brush 16 is at least partly accommodated in the armature 4. This arrangement makes the axial length of the motor shorter, particularly when combined with the bearing 6a, the brush 16 and the commutator 15 being positioned within the axial length region of the armature 4.

The core 9 of the armature 4 is in the form of a molding which is formed of soft magnetic powder material. The shape of the core 9 thus becomes more flexible in comparison with known cores formed of stacked iron or steel plates, and can thus be produced more easily. In addition, employing powder material which is relatively large in specific resistance makes it possible to restrict eddy current loss when compared to the aforementioned stacked core structure. This thus improves the motor efficiency.

For the minimum requirement magnetic flux path, the core 9 is provided with a hollow portion and/or is formed of resin as much as possible, which reduces its weight (inertia). It thus becomes possible to produce the core 9 in a relatively simple structure possessing initial or starting responsiveness according to the required specification when compared to the aforementioned steel stacked core.

The bearing 6a located closer to the brush 16 is placed nearer the bottom wall of the concave portion 12 than the brush 16. Thus, the brush holder 17 becomes detachable without interfering with the bearing 6a. The brush 16 can thus be relatively easily replaced. In addition, the span between the bearings 6a, 6b becomes shorter, which reduces the flexing of the shaft 5 when the extended portion of the shaft 5 from the case 2 is applied with a perpendicular force.

The pair of brushes 16, 16 having a phase difference of 180 degrees for being brought into contact with the respective commutator members 15a extend in parallel with each other in a common plane. Compared to a construction in which the brushes are placed on a common straight line, the accommodating portions 19 in which the brush 16 and the coil spring 18 of the present invention are accommodated can be made longer. Making the brush 16 longer can contribute to increasing the life of the brush 16 and the replacement cycle of the brush 16.

Also, by mounting the brush holder 17 in the recessed portion 12 so that the brush holder 17 rests on the stepped portion 3a of the boss portion 3, a relatively precise positioning of the brush 16 can be established.

Figure 3:
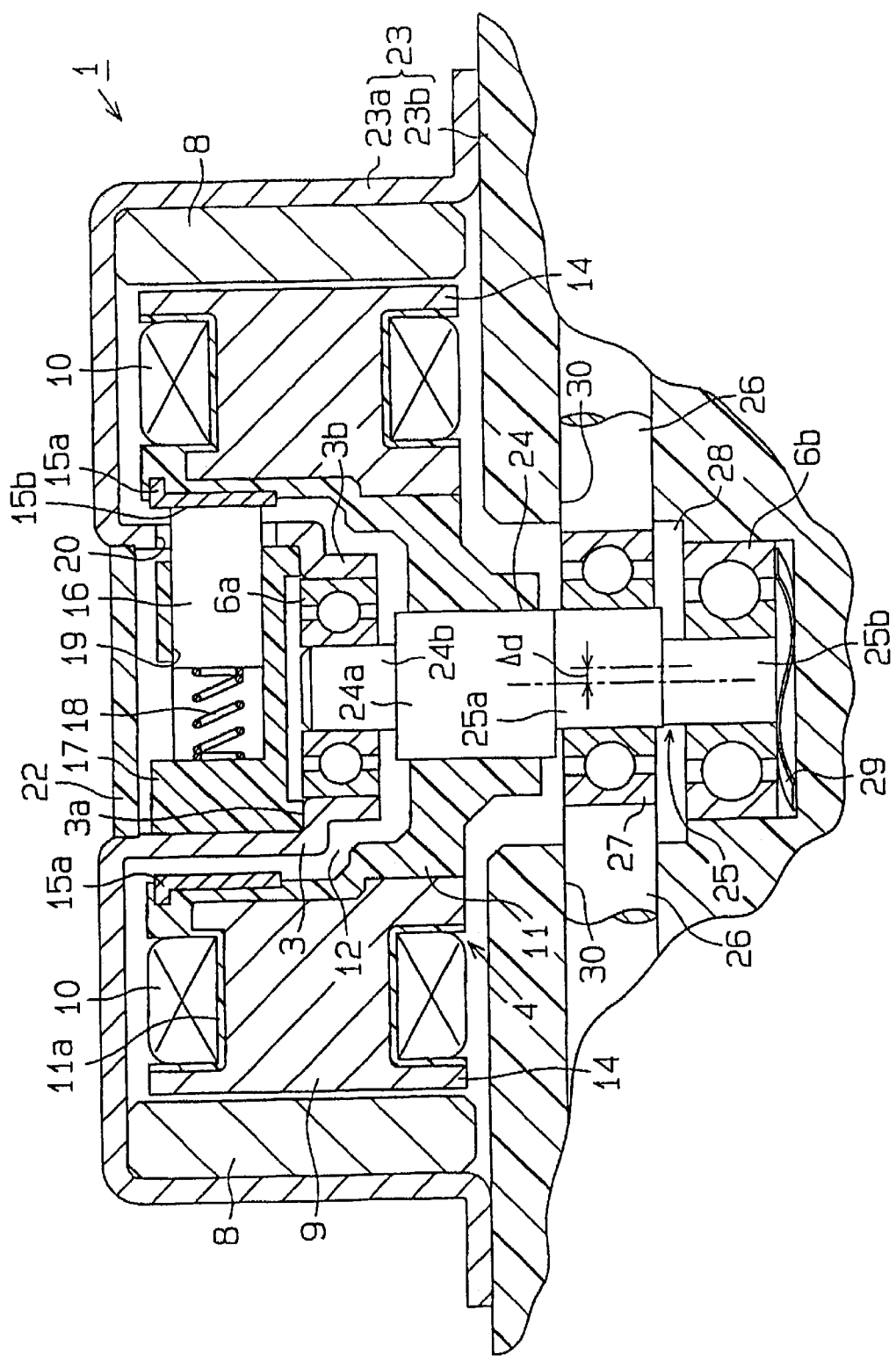
FIG. 3 is a cross-sectional view of a DC motor in accordance with a second embodiment of the present invention.

Another version of the DC brush motor 1 of the present invention is illustrated in FIG. 3. The motor 1 according to this aspect of the present invention is used as a pump driving source for a vehicular ABS (anti-skid braking system) and is thus different from the motor according to the first embodiment in that shaft rotation movement is used as a plunger reciprocating movement. The elements in this version of the present invention that are the same as those in the above-described version of the invention are designated by the same reference characters.

The motor 1 includes a case 23 having a main body 23a, similar to the first embodiment, in which is accommodated an armature 4, a magnet 8, a commutator 15, and a brush 16. The main body 23a of the case 23 is secured to a pump housing 23b.

The armature 4 has a shaft 24 which possesses a stepped configuration that includes a larger diameter portion 24a and a smaller diameter portion 24b which extends from the large diameter portion 24a towards a brush 16. A supporting member 11 is fixed on the larger diameter portion 24a while a bearing 6a is fixedly mounted on the small diameter portion 24b. An output shaft portion 25 is formed on the side of the large diameter portion 24a which is opposite the small diameter portion 24b. The output shaft portion 25 is made up of an eccentric portion 25a and a smaller diameter portion 25b. The eccentric portion 25a is in continual formation with (i.e., forms a continuation of the larger diameter portion 24). The smaller diameter portion 25b is formed as a continuation of the eccentric portion 25a and is in co-axial alignment with the larger diameter portion 24a and the smaller diameter portion 24b of the shaft 24.

Mounted or provided on the eccentric portion 25a is a transmission bearing 27 for transmitting rotational movement of the output shaft 25 to a plunger 26, as a driving source, which converts the rotational movement of the output shaft 25 into reciprocating movement of the plunger 26. An outer race of the transmission bearing 27 is in pressure contact with the end portion of the plunger 26.

The pump housing 23b is formed with an accommodating portion 28 which extends in a direction opposite to or away from the main body 23a of the case 23. A bearing 6b is fixed in the accommodating portion 28 and supports the small diameter portion 25b of the shaft 24. The transmission bearing 27 is located inwardly of the bearing 6b for supporting the shaft 26. The inner race 6b and the shaft 24 are urged by a wavy plate spring 29 in the direction of the main body 23a of the case 23.

A pair of radially outwardly extending guide bores 30, 30 are formed in the wall portion of the accommodating portion 28 of the pump housing 23b. The guide bores 30, 30 are symmetrically positioned and slidably receive the respective plungers 26, 26.

In operation, when electric current is applied to the coil winding 10 by way of the brush 16 and the commutator 15, the shaft 24 is rotated together with the core 9. As a result, the eccentric portion 25a of the output shaft 25 is brought into eccentric rotation together with the transmission bearing 27. Thus, the plunger 26 which is in continual contact with the transmission bearing 27 under pressure is brought into reciprocating movement with a stroke that is twice as long as the eccentric amount Δd, thereby converting the rotational movement of the shaft 24 into reciprocating linear movement of the plungers.

Some of the same advantages as those discussed above are equally applicable to this version of the motor according to the present invention. In addition, other advantages are also realized. For example, the span between the bearings 6a, 6b is smaller than that in other known motor constructions. The flexing or bending of the shaft 24 resulting from radial force application when the plunger 26 reciprocates is thus smaller compared to other known motors, thereby diminishing noise and vibration.

The transmission bearing 27 is located inside the bearing 6b and the radial force applied to the shaft 24 is received at a position on the shaft 24 which is in the vicinity of the bearing 6b. This makes the flexing or bending of the shaft 24 much smaller.

It is to be understood that the present invention is not limited to the particular constructions described above as various alternatives can be employed. For example, the positioning of the brushes 16 shown in FIG. 2 is used in connection with a lap winding of 2 or 6 poles, while in the case of 4 pole lap winding, wave winding, and concentrated winding, as illustrated in FIGS. 4(a) and 4(b), the brushes 16, 16 are positioned at a phase difference of 90 degrees relative to one another so as to be brought into contact with the respective brush contact portions 15b. When two brushes 16, 16 are placed in a relatively close relationship with one another to move along respective lines meeting at right angles while employing coil springs for urging each of the brushes 16, 16, it is difficult to make the urging force of each of the coil springs sufficiently adequate while also arranging the coil springs 16 without mutual interference.

However, as shown in FIG. 4(a), employing a pair of torsion springs 31 as the urging mechanism makes it possible to avoid interference between the torsion springs 31. Also, as shown in FIG. 4(b), it is possible to employ a brush 16 configured to move along an arc-shaped surface, a guide portion 32 guiding the brush 16 into the accommodating portion such that the brush 16 is not required to pass the center of the brush holder 17, and a coil spring 18 for urging the brush 16.

It is also possible to set a phase difference of 180 degrees between the pair of brushes 16, 16 so that each of the brushes is ready for being in contact with the corresponding brush contact portion 15b, which results in that the brushes 16 are in co-axial alignment. In such a structure, employing torsion springs as the urging mechanism instead of coil springs makes it possible to elongate or lengthen the brush, which makes possible a longer replacement period.

Depending upon the number of poles, the angle defined by the axis of the motor and the brush contact portion 15b on which the brush 16 abuts, or the angle between the brushes may be other than 180 degrees or 90 degrees, for example 120 degrees.

In the motor in which the transmission bearing 27 is provided on the eccentric portion 25a as the portion of the output shaft 25, as shown in FIG. 5, the transmission bearing 27 can be placed outside the bearing 6b which supports the shaft 5 of the armature 4. With this structure, although the transmission bearing 6b is mounted on the output shaft 25 which is in a cantilevered condition, even if a radial force is applied to the shaft 5 by way of the transmission bearing 27, the flexing of the shaft 5 is smaller than other known constructions because the shaft 5 is relatively small in axial length, resulting in less noise and less vibrations.

It is also possible to employ a construction in which the recessed portion 13 is deeper and the bearing supporting portion 7 is longer. In this way, the entirety or substantial entirety of the bearing 6b at the far side of the brush 16 can be placed in the armature 4. The axial length of the motor can thus be further shortened.

As shown in FIG. 6, it is possible to configure the bearing supporting portion 7 in the end plate 2 by bending the end plate 2 in the direction opposite to the main body 2a of the case 2 (i.e., away from the bottom wall of the main body 2a), with the bearing 6b at the far side of the brush 16 being supported In the bearing supporting portion 7.

Instead of using the cover 22 which closes the opening positioned opposite the small radius portion 3b of the bent portion 3, it is possible to employ a structure such as shown in FIG. 6. Here, the opening is closed by the brush holder 17 and the two brushes 16 are integrated with the connector 34 that is provided with the power source terminals 33 for connection to the lead wires. This structure reduces the number of parts, thereby reducing the burden of assembly and making the replacement of the brush 16 relatively easy.

As an alternative to supporting the bearing 6a located nearer to the brush 16 in the bent portion 3 of the main body 2a of the case 2, the bearing 6a can be supported at the brush holder. For example, as shown in FIG. 7, the bent portion 3 is relatively short and is adapted to receive the brush holder 35 in a snugly fitting manner, with the flange portion 35a of the brush holder 35 having a larger outer diameter or dimension than the bent portion 3. At the opposite side of the flange portion 35a, a bearing support portion 35b is provided which is detachably mounted on the outer race of the bearing 6a. Upon replacement of the brush 16, the brush holder 35 is removed by releasing the fitting engagement between the bearing supporting portion 35b and the bearing 6a. In this embodiment, the brush 16 is held in position by the engagement of the flange portion 35a with the outer surface of the main body 2a of the case 2. In this construction, it is not necessary to form the stepped portion 3a and/or the small diameter portion 3b by lengthening the bent portion 3, and the holes 20 through which pass the brushes 16 are not required. As a result, the processing or fabrication of the main body 2a of the case 2 is simplified.

With respect to connecting the armature 4 to the shaft 5 to establish concurrent rotations, instead of forming the resin-made supporting member 11 integrally with the shaft 5, the alternative shown in FIG. 8 is possible. Here, the core 9 is configured for being fitted with the shaft 5 in a direct fashion and a connection is made between the core 9 and the shaft 5 by using a bonding agent.

It is also possible to utilize a brush holder 17 construction such as shown in FIG. 9 which once again does away with the need for the cover 22 and engages the main body 2a of the case 2 to provide a connector 34 whose power source terminals 33 extend at an angle of 90 degrees relative to the shaft 5.

The bearing 6a that is located at the near side of the brush 16 is not limited to a location inside the brush 16. That is, the bearing 6a is still preferably positioned in the concave portion 12 of the armature 4, but is located outside the brush 16. For example, as shown in FIG. 10, the shaft 5 of the armature 4 is supported by the bearing 6b in a cantilever fashion, while the bearing 6a is detachably fitted in the opening of the concave portion 12. Each commutator segment 15a of the commutator 15 is placed nearer to the bottom of the concave portion 12 than the bearing 6a. A large diameter hole 36 having a larger radius or size than the bearing 6a is formed in the main body 2a of the case 2. The brush holder 37 extends in the outward direction and is fitted in the supporting member 38 which is fitted in the inner race of the bearing 6a. The supporting member 38 is detachably coupled to the main body 2a of the case 2 by means of a connection mechanism such as a bolt 39. Upon replacement of the brush 16, the brush holder 17 is removed together with both the supporting member 38 and the bearing 6a.

Instead of forming the holes 20 in the bent portion 3, a notch can be formed at the open end of the recessed or cup-shaped portion 12. With this construction, upon replacement of the brush 16, the removal of the brush holder 17 can be relatively easily performed by moving the brush holder 17 in the direction of its length.

With respect to the construction of the core 9 which is in the form of a soft magnetic powder molding, compressing resin bonded soft magnetic material into the desired or necessary form represents another possibility. The resin bonded soft magnetic material is complex material obtained by covering powder particles of soft magnetic material with resin having electric insulation properties and adhesive properties. As the soft magnetic powder material, Fe—Si family alloy powder, Fe—Ne family alloy powder, Fe—Co family alloy powder and so on are available materials. When using the alloy powder, the magnetic flux density becomes higher than when using pure iron powder subject to that the amount of the former material is equal to the amount of the latter material. In addition, the core 9 can be made by molding resin-mixed soft magnetic powder material.

Of course, the core 9 can also be in the form of stacked iron steel plates or stacked silicon steel plates.

The use of the commutator having the inwardly oriented brush contact portion with which the outwardly oriented brush is brought into contact is applicable to other motors having a construction different from the construction in which the commutator 15 and the brush 16 are accommodated in the concave or cup-shaped portion 12 so as to be within the axial length range of the armature 4. For example, the commutator construction can be employed in a DC motor in which the brush and the commutator are provided outside the armature like other known motors.

It is also to be understood that the DC brush motor 1 of the present invention can be used as a driving source in applications other than automotive vehicles.

One aspect of the present invention utilizes a pair of spaced apart brushes arranged in parallel so as to extend in a common plane. This construction advantageously makes the brush much longer as compared to a construction in which the pair of brushes are arranged in coaxial alignment, assuming that both structures are generally the same with respect to the accommodating space and the urging mechanism. The replacement period of the brush becomes longer and the frequency of the replacement operation is reduced.

The present invention also envisions the use of a torsion spring as a mechanism for urging the brushes toward the brush contact portions. Such a structure makes the brush longer as compared to the use of a coil spring, assuming that both structures are of the same general accommodating space.

Another aspect of the present invention involves placing the bearing located closer to the brush at a position nearer to the bottom of the recessed or cup-shaped portion relative to the brush. Such an arrangement makes it possible to remove the brush holder without the bearing, thereby making the brush replacement operation easier.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A DC brush motor comprising:
   an armature rotatable about a central axis;
   a commutator rotatable together with the armature, the commutator having a radially inwardly oriented brush contact portion; and a radially outwardly extending brush having an end facing the brush contact portion of the commutator, the brush being adapted to contact the brush contact portion of the commutator, the brush being mounted on a non-rotatable portion of the motor so that the brush is non-rotatable, the brush having an axis which intersects said end and does not pass through the central axis of the armature.

2. The DC brush motor as set forth in claim 1, wherein the armature is provided with a cup-shaped portion in which is positioned the brush.

3. The DC brush motor as set forth in claim 2, wherein said armature extends axially over an axial length range, and including a pair of bearings rotatably supporting the armature, one of the bearings being positioned in the cup-shaped portion of the armature so that said one bearing is within the axial length range of the armature.

4. The DC brush motor as set forth in claim 3, wherein said other bearing is accommodated in the armature so that said other bearing is at least partly within the axial length range of the armature.

5. The DC brush motor as set forth in claim 1, wherein the armature includes a core formed as a molding made of soft magnetic powder material.

6. The DC brush motor as set forth in claim 1, wherein the armature includes a shaft having an eccentric output shaft portion, and including a transmission bearing mounted on the eccentric output shaft portion to transmit rotational movement of the output shaft portion into reciprocating movement of a driving portion.

7. The DC brush motor as set forth in claim 6, including a pair of bearings rotatably supporting the shaft, the transmission bearing being located between the pair of bearings.

8. The DC brush motor as set forth in claim 1, wherein the brush is a first brush, and including a second brush having an axis that does not pass through the central axis of the armature.

9. The DC brush motor as set forth in claim 1, wherein the armature is comprised of a coil, a coil winding and a supporting member made of resin, the supporting member being formed integrally with the core, a shaft and the commutator so that the core rotates together with the shaft.

10. A DC brush motor comprising:
an armature having a recessed portion, the armature extending axially over an axial length range;
a magnet extending over an axial length range;
a pair of bearings rotatably supporting the armature;
a commutator rotatable together with the armature, the commutator having a radially inwardly oriented brush contact portion;
a radially outwardly extending brush adapted to contact the brush contact portion of the commutator, one of the bearings being located closer to the brush than the other bearing;
the brush and the commutator being accommodated in the recessed portion of the armature, and the entirety of the one bearing being within the axial length range of the magnet.

11. The DC brush motor as set forth in claim 10, wherein said other bearing is accommodated in the armature so that said other bearing is at least partly within the axial length range of the armature.

12. The DC brush motor as set forth in claim 10, wherein the armature includes a core formed as a molding made of soft magnetic powder material.

13. The DC brush motor as set forth in claim 10, wherein the armature includes a shaft supported by the pair of bearings, the shaft including an eccentric output shaft portion, and a transmission bearing mounted on the eccentric output shaft portion to transmit rotational movement of the output shaft portion into reciprocating movement of a driving portion, the transmission bearing being located between the pair of bearings.

14. A DC brush motor comprising:
an armature extending axially over an axial length range;
a magnet extending over an axial length range;
a commutator rotatable together with the armature, the commutator having a radially inwardly oriented brush contact portion; and
a radially outwardly extending brush adapted to contact the brush contact portion of the commutator, the brush being mounted on a non-rotatable portion of the motor so that the brush is non-rotatable, the brush being within the axial length range of the magnet.

15. The DC brush motor as set forth in claim 14, wherein the brush is a first brush, and including a second brush having an axis that does not pass through the central axis of the armature.

16. The DC brush motor as set forth in claim 14, wherein the armature is comprised of a coil, a coil winding and a supporting member.

17. The DC brush motor as set forth in claim 16, wherein the supporting member is formed integrally with the core, a shaft and the commutator so that the core rotates together with the shaft.

18. The DC brush motor as set forth in claim 14, wherein the armature is provided with a cup-shaped portion in which is positioned the brush.

19. The DC brush motor as set forth in claim 14, wherein the armature includes a core formed as a molding made of soft magnetic powder material.

20. The DC brush motor as set forth in claim 14, wherein the armature is fixedly mounted on the shaft, and including a pair of bearings rotatably supporting the shaft.

* * * * *